(12) United States Patent
Dai et al.

(10) Patent No.: US 12,292,199 B2
(45) Date of Patent: May 6, 2025

(54) TURBULENCE GENERATOR MIXER FOR ROTATING DETONATION ENGINE

(71) Applicant: Raytheon Technologies Corporation, Farmington, CT (US)

(72) Inventors: Zhongtao Dai, West Hartford, CT (US); Peter A T Cocks, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/213,571

(22) Filed: Jun. 23, 2023

(65) Prior Publication Data
US 2024/0011637 A1   Jan. 11, 2024

Related U.S. Application Data

(62) Division of application No. 17/225,500, filed on Apr. 8, 2021, now Pat. No. 11,725,824.

(51) Int. Cl.
| | | |
|---|---|---|
| *F23R 7/00* | (2006.01) | |
| *F02C 5/00* | (2006.01) | |
| *F02C 5/02* | (2006.01) | |

(52) U.S. Cl.
CPC .......... *F23R 7/00* (2013.01); *F02C 5/00* (2013.01); *F02C 5/02* (2013.01)

(58) Field of Classification Search
CPC .... F23R 7/00; F23R 3/34; F23R 3/346; F02C 5/00
See application file for complete search history.

(56) References Cited

U.S. PATENT DOCUMENTS

| | | | | |
|---|---|---|---|---|
| 3,872,664 | A * | 3/1975 | Lohmann | F23R 3/346 |
| | | | | 431/9 |
| 5,129,231 | A * | 7/1992 | Becker | F23R 3/14 |
| | | | | 60/754 |
| 5,297,385 | A * | 3/1994 | Dubell | F23R 3/50 |
| | | | | 60/757 |
| 5,307,637 | A * | 5/1994 | Stickles | F23R 3/002 |
| | | | | 60/757 |
| 5,335,491 | A * | 8/1994 | Barbier | F23R 3/34 |
| | | | | 60/747 |
| 5,749,219 | A * | 5/1998 | DuBell | F23R 3/346 |
| | | | | 60/737 |
| 6,201,029 | B1 * | 3/2001 | Waycuilis | C01B 3/382 |
| | | | | 518/703 |

(Continued)

*Primary Examiner* — William H Rodriguez
(74) *Attorney, Agent, or Firm* — Bachman & LaPointe, P.C.

(57) ABSTRACT

A combustor for a rotating detonation engine includes a radially outer wall extending along an axis (A); a radially inner wall extending along the axis (A), wherein the radially inner wall is positioned within the radially outer wall to define an annular detonation chamber having an inlet for fuel and oxidant and an outlet; a first passage for feeding at least one of the fuel and the oxidant along a first passage axis ($a_1$) to the inlet; a second passage for feeding at least one of the fuel and the oxidant along a second passage axis ($a_2$) to the inlet, wherein the second passage axis is arranged at an angle ($\alpha$) relative to the first passage axis whereby mixing of flow from the first passage and the second passage is induced.

6 Claims, 6 Drawing Sheets

(56) References Cited

U.S. PATENT DOCUMENTS

| | | | | |
|---|---|---|---|---|
| 6,546,733 B2* | 4/2003 | North | | F23R 3/04 |
| | | | | 60/740 |
| 6,955,053 B1* | 10/2005 | Chen | | F23R 3/50 |
| | | | | 60/752 |
| 7,278,256 B2 | 10/2007 | Norris et al. | | |
| 7,506,512 B2* | 3/2009 | Schumacher | | F23R 3/50 |
| | | | | 60/754 |
| 8,677,757 B2* | 3/2014 | Sadig | | F23M 20/005 |
| | | | | 60/725 |
| 8,683,780 B2* | 4/2014 | Shimo | | F02C 5/02 |
| | | | | 60/39.38 |
| 8,938,970 B2* | 1/2015 | Gerendas | | F23R 3/06 |
| | | | | 60/804 |
| 2004/0123582 A1 | 7/2004 | Norris et al. | | |
| 2006/0254254 A1 | 11/2006 | Saddoughi et al. | | |
| 2006/0260291 A1* | 11/2006 | Vandervort | | F23C 15/00 |
| | | | | 60/39.76 |
| 2007/0180810 A1* | 8/2007 | Chapin | | F01D 25/12 |
| | | | | 60/776 |
| 2010/0186370 A1* | 7/2010 | Daniau | | F02K 7/04 |
| | | | | 60/247 |
| 2012/0131899 A1* | 5/2012 | Brumberg | | F23R 7/00 |
| | | | | 60/39.76 |
| 2014/0007581 A1* | 1/2014 | Tuthill | | F23R 3/286 |
| | | | | 60/737 |
| 2018/0080412 A1 | 3/2018 | Mizener et al. | | |
| 2018/0156463 A1* | 6/2018 | Dai | | F23R 3/14 |
| 2018/0163629 A1* | 6/2018 | Proscia | | F23R 3/346 |
| 2018/0274439 A1 | 9/2018 | Holley et al. | | |
| 2018/0335214 A1 | 11/2018 | Strickland | | |
| 2019/0086086 A1 | 3/2019 | Tangirala et al. | | |
| 2019/0128529 A1 | 5/2019 | Tangirala et al. | | |
| 2020/0070961 A1* | 3/2020 | Rathay | | F23R 7/00 |
| 2020/0149743 A1 | 5/2020 | Singh et al. | | |
| 2021/0025323 A1* | 1/2021 | Nakao | | F23R 3/06 |
| 2021/0095849 A1* | 4/2021 | Asai | | F23R 3/46 |
| 2021/0140641 A1* | 5/2021 | Singh | | F02C 5/02 |
| 2021/0164660 A1 | 6/2021 | Dyson et al. | | |
| 2024/0077028 A1* | 3/2024 | Greene | | F02C 7/224 |

* cited by examiner

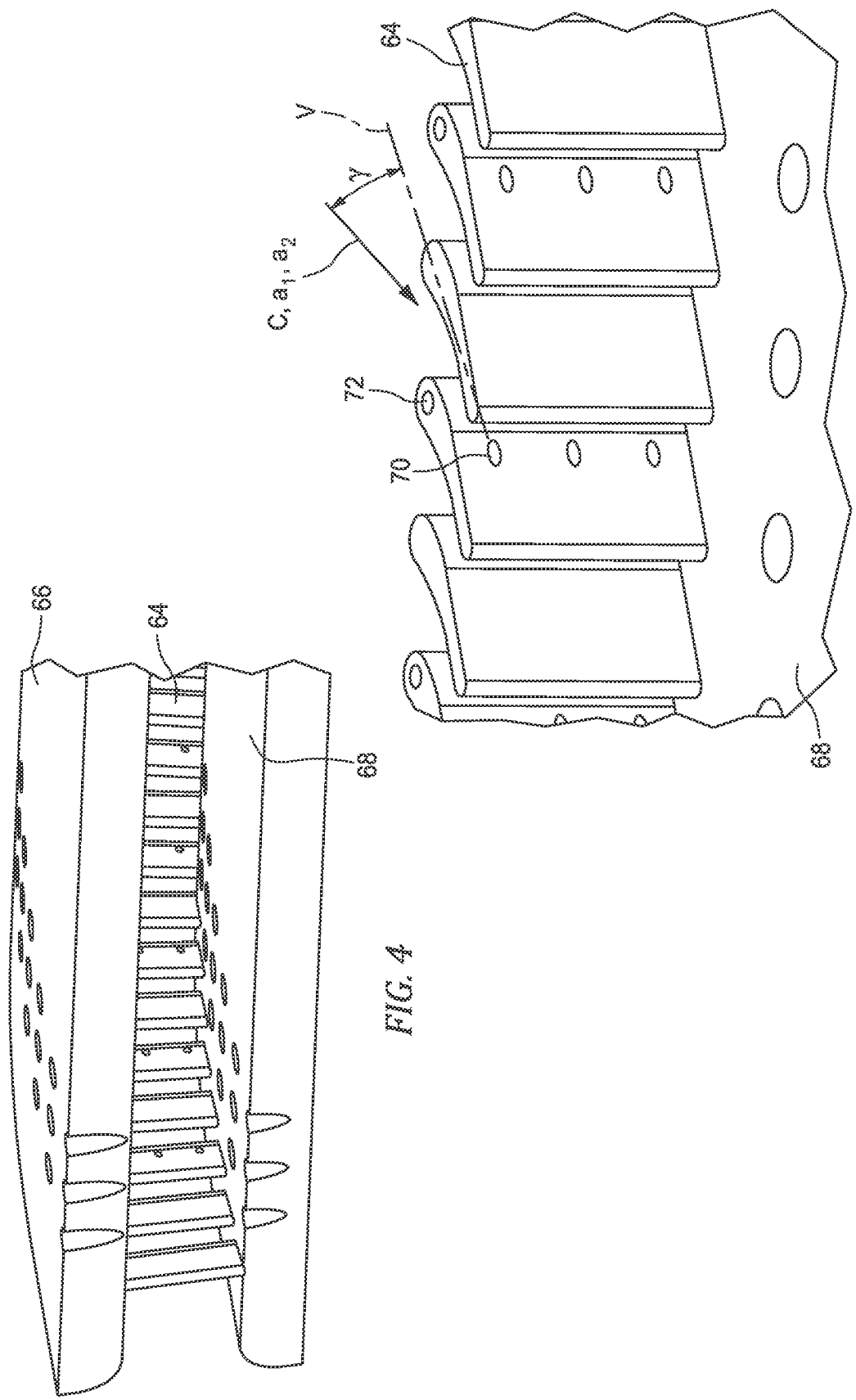

TURBULENCE GENERATOR MIXER FOR ROTATING DETONATION ENGINE

CROSS-REFERENCE TO RELATED APPLICATIONS

This application is a divisional of U.S. patent application Ser. No. 17/225,500, filed Apr. 8, 2021.

GOVERNMENT LICENSE RIGHTS

This invention was made with government support under contract number FA8650-18-D-2062, Task Order FA8650-18-F-2077 awarded by the United States Air Force. The government has certain rights in the invention.

BACKGROUND

The disclosure relates to rotating detonation engines and, more particularly, to structures for enhancing mixing of fuel and air introduced to the combustor of rotating detonation engines.

A rotating detonation engine (RDE) includes an annulus with an inlet end through which a fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus as exhaust flow.

The detonation wave provides a high-pressure region in an expansion region of the combustion. Rotating detonation pressure gain combustion systems can have significant advantages over other alternatives including pulse detonation pressure gain combustors.

Premixing of the fuel and air to be fed to the annulus can impact performance of the RDE. Further, RDEs operate at high equivalence ratios and hence good mixing is required to get good combustion efficiency. Further, the type of fuel can make mixing more difficult. For example, mixing gaseous Jet A fuel with air is more difficult than mixing small molecular fuel like $CH_4$ and $C_2H_4$. Atomization and mixing of liquid fuel is even more challenging.

Maintaining a uniform detonation wave velocity and minimum pressure fluctuation, and avoidance of turbulent deflagrations can also be facilitated with effective premixing.

During operation, an RDE generates significant pressure waves that circulate in the annulus but also can propagate upstream. This can impact upstream components and delay recovery times of components such as the RDE fuel injector.

SUMMARY

In one non-limiting configuration, a combustor for a rotating detonation engine comprises a radially outer wall extending along an axis (A); a radially inner wall extending along the axis (A), wherein the radially inner wall is positioned within the radially outer wall to define an annular detonation chamber having an inlet for fuel and oxidant and an outlet; a first passage for feeding at least one of the fuel and the oxidant along a first passage axis ($a_1$) to the inlet; a second passage for feeding at least one of the fuel and the oxidant along a second passage axis ($a_2$) to the inlet, wherein the second passage axis is arranged at an angle ($\alpha$) relative to the first passage axis whereby mixing of flow from the first passage and the second passage is induced.

In another non-limiting configuration, the combustor further comprises a diffuser having a diffuser outlet connected to the inlet, and having a diffuser inlet communicated with the first passage and the second passage, whereby a mixed flow from the first passage and the second passage is expanded before reaching the inlet.

In still another non-limiting configuration, the angle ($\alpha$) is between 15 and 90 degrees.

In a still further non-limiting configuration, the first passage is communicated with a source of the oxidant, and the second passage is communicated with a source of the fuel and a source of the oxidant.

In another non-limiting configuration, the combustor further comprises a fuel injector port communicated with the second passage whereby the fuel is fed to the second passage, wherein there is no direct line of sight from the annular detonation chamber to the fuel injector port.

In still another non-limiting configuration, the second passage defines a flow passage for oxidant, and the fuel injector port injects fuel into the second passage substantially perpendicular to the flow passage for oxidant.

In a further non-limiting configuration, the combustor further comprises a wall defined across a flow area of at least one of the first passage and the second passage and an array of holes defined in the wall to induce turbulence to oxidant flowing through the array.

In a still further non-limiting configuration, the array of holes are oriented along an array axis, and the array axis is oriented relative to the first passage axis or the second passage axis at an angle ($\beta_1$) of between 10 and 30 degrees.

In another non-limiting configuration, the array of holes comprises a first portion of holes oriented along a first array axis oriented relative to the first passage axis or the second passage axis at a first portion angle ($\beta_1$) of between 10 and 30 degrees, and the array of holes comprises a second portion of holes oriented along a second array axis oriented relative to the first passage axis or the second passage axis at a second portion angle ($\beta_2$) of between 10 and 30 degrees, and the first portion angle and the second portion angle are oppositely angled relative to the first passage axis or the second passage axis.

In still another non-limiting configuration, the combustor further comprises a splitter separating the first portion of holes from the second portion of holes.

In a further non-limiting configuration, the splitter separates the first portion of holes radially from the second portion of holes.

In a still further non-limiting configuration, the combustor further comprises additional holes downstream of the wall for introducing additional oxidant to the at least one of the first passage and the second passage.

In another non-limiting configuration, the fuel is fed to at least one of the first passage and the second passage through a fuel injector port, and the fuel injector port is located downstream of the wall.

In still another non-limiting configuration, the combustor further comprises a swirler in at least one of the first passage and the second passage, wherein the swirler is defined by a plurality of vanes extending between radially outer and radially inner walls of the at least one of the first passage and the second passage.

In a further non-limiting configuration, the plurality of vanes are oriented at an angle ($\gamma$) relative to an axis of the at least one of the first passage and the second passage to induce swirl to the oxidant flowing into the inlet, wherein the angle ($\gamma$) is between 10 and 45 degrees.

In a still further non-limiting configuration, the combustor further comprises fuel injectors in the plurality of vanes, whereby fuel injected through the fuel injectors is atomized by oxidant flowing past the plurality of vanes.

In another non-limiting configuration, the plurality of vanes are sufficiently angled to block direct line of sight from the annular detonation chamber along the axis to an upstream side of the swirler.

In still another non-limiting configuration, a combustor for a rotating detonation engine comprises a radially outer wall extending along an axis; a radially inner wall extending along the axis, wherein the radially inner wall is positioned within the radially outer wall to define an annular detonation chamber having an inlet for fuel and oxidant and an outlet; a flow passage for feeding oxidant to the inlet; and a wall defined across a flow area of the inlet and an array of holes defined in the wall to induce turbulence to oxidant flowing through the array.

In a further non-limiting configuration, a combustor for a rotating detonation engine comprises a radially outer wall extending along an axis; a radially inner wall extending along the axis, wherein the radially inner wall is positioned within the radially outer wall to define an annular detonation chamber having an inlet for fuel and oxidant and an outlet; and a swirler in a flow passage for feeding the oxidant to the inlet, wherein the swirler is defined by a plurality of vanes extending between radially outer and radially inner walls of the flow passage.

In a still further non-limiting configuration, the combustor further comprises fuel injectors in the plurality of vanes, whereby fuel injected through the fuel injectors is atomized by oxidant flowing past the plurality of vanes.

The present disclosure may include any one or more of the individual features disclosed above and/or below alone or in any combination thereof.

BRIEF DESCRIPTION OF THE DRAWINGS

A detailed description follows, with reference to the accompanying drawings, wherein:

FIG. 4 illustrates a non-limiting configuration of a swirler for a rotating detonation engine;

FIG. 5 further illustrates an aspect of the configuration of FIG. 4;

DETAILED DESCRIPTION

The disclosure relates to a mixer or premixer for a combustor of a rotating detonation engine (RDE). As disclosed herein, the premixer can be configured to provide a relatively high degree of turbulence and mixing of the fuel and oxidant prior to entry of the combustor, thereby enhancing combustion efficiency and overall operation of the RDE.

Figure 1:
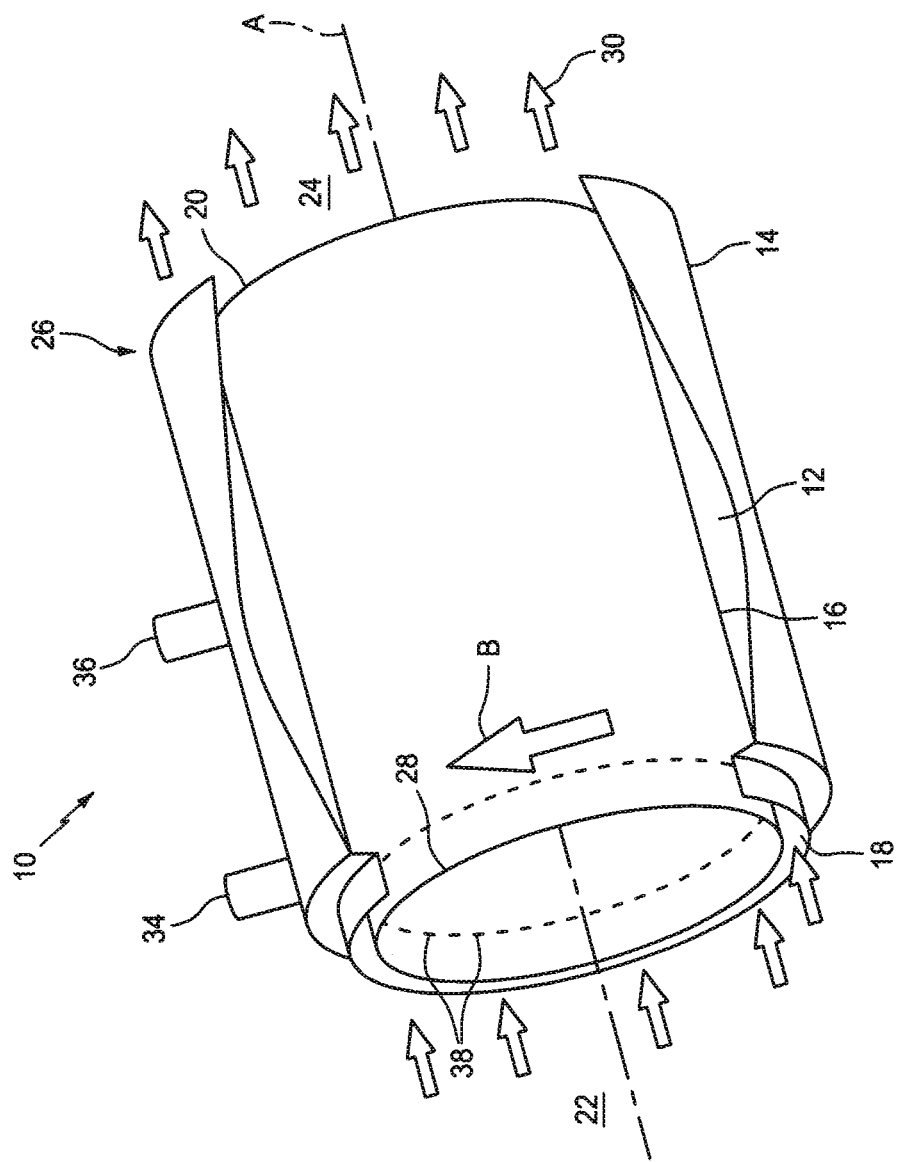
FIG. 1 schematically illustrates a rotating detonation engine.

FIG. 1 is a schematic and simplified diagram of an RDE 10. As seen in FIG. 1, RDE 10 includes a combustor or detonation chamber 12 defined between a radially outer wall 14 and a radially inner wall 16. Detonation chamber 12 is an annular combustor or combustion chamber, and has an inlet 18 and an outlet 20. Fuel and oxidant, collectively referred to as reactants, are introduced to the inlet 18 in various manners. Flow of reactants through an RDE 10 defines an upstream end 22 and a downstream end 24. RDE 10 can be cylindrical as shown. The axis A of the cylinder is illustrated in FIG. 1. The longitudinal extent of RDE 10 is the extent along the longitudinal axis A. The upstream end 22 and downstream end 24 may be referred to as the two axial ends of RDE 10. Detonation chamber 12 is defined by radially outer wall 14, which can be the inner wall surface of a housing 26, and radially inner wall 16, which can be the outer wall surface of a centerbody 28 defined along axis A. Accordingly, detonation chamber 12 has a generally annular cross section.

It is possible for RDE 10 to have a shape other than that of a cylinder and for detonation chamber 12 to have a cross section other than annular (and hence for the continuous detonation wave to traverse a path that is other than circular). For simplicity, RDEs described herein will generally be described as cylindrical with annular detonation chambers (and hence with the continuous detonation wave propagating in a circumferential direction, or circular path, around the detonation chamber).

It will be understood that any feature or embodiment described herein, although described in the context of a cylindrical RDE with annular detonation chamber, may be in a non-cylindrical RDE with non-annular detonation chamber, unless specifically indicated to the contrary.

In operation, once a detonation wave is initiated in RDE 10, the detonation wave continues in a circumferential direction around the annular detonation chamber 12, as shown by arrow B in FIG. 1. Fuel and oxidizer can be continually injected into detonation chamber 12 in order to sustain the detonation wave. The detonation products are ejected or exhausted out the exit or downstream end 24 (as indicated by the generally horizontal, rightward pointing arrows shown at the right side of FIG. 1) to produce thrust or otherwise extract work.

Detonation is a combustion process consisting of a shock wave coupled to and sustained by a trailing combustion front. The wave speed is on the order of thousands of meters per second, compared with a flame speed on the order of tens of meters per second for deflagration. This built-in compression and rapid heat release of detonation result in lower entropy gain, and thus higher thermodynamic efficiency, as compared to deflagration, given the same initial conditions.

It should be noted that the use of the term "detonation chamber" as used herein does not mean that no non-detonative combustion ever occurs. Rather, non-detonative combustion may occur, and may even regularly occur, in a detonation chamber of an RDE. The term "combustion chamber" may also be used in this disclosure to refer to a detonation chamber of an RDE.

RDE 10 may include a nozzle (not shown) at the downstream end 24, or any other structure appropriate to the specific implementation of the RDE. At upstream end 22, fuel and oxidant can be introduced in various ways, for example directly through an inlet 18 to detonation chamber 12, or through injector inlets or openings that can be located at 34, 36 and 38.

Figure 2:
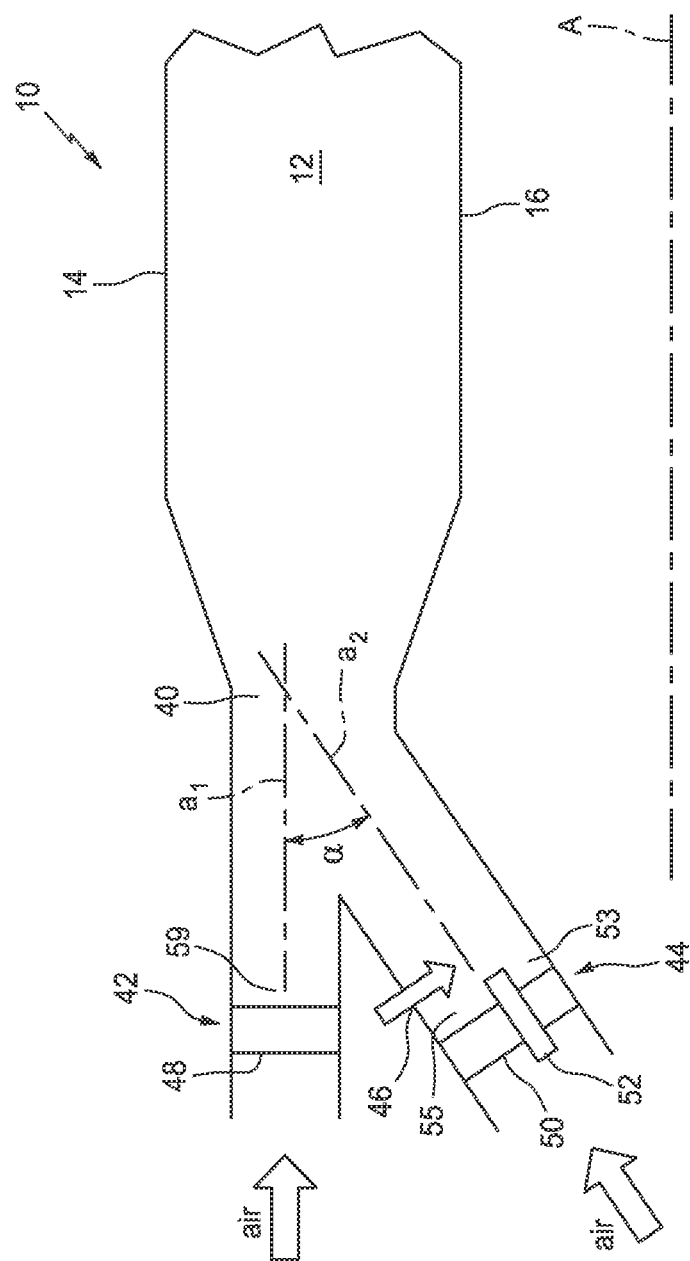
FIG. 2 illustrates a non-limiting configuration of a mixer for a rotating detonation engine.

FIG. 2 is a schematic illustration of one non-limiting configuration of RDE 10 wherein fuel and oxidant are premixed as they are fed to the detonation chamber 12. FIG. 2 shows detonation chamber 12 defined between radially outer wall 14 and radially inner wall 16. Fuel and oxidant are fed to chamber 12 through a diffuser 40 from a first passage 42 and a second passage 44. First and second passages 42, 44 are angled relative to each other to create a mixing zone for the reactants. In the example illustrated, first passage 42 is directed along a first passage axis ($a_1$) that is substantially parallel with axis A, while second passage 44 is directed along a second passage axis ($a_2$) that is angled relative to first passage 42 and first passage axis ($a_1$) to define an angle α therebetween. In one non-limiting configuration, the angle α can be between 15 and 90 degrees. The angle can be a circumferential angle, meaning that axis $a_2$ is defined in a plane with axis $a_1$ wherein the plane also includes axis A. This angling of flow through first passage 42 and second passage 44 serves to introduce mixing and turbulence of reactants from these flow passages at or just upstream of diffuser 40. In this configuration, flow through second passage 44 could have a component that is substantially parallel to axis A and a component that is perpendicular to axis A, but no component that swirls around axis A. In other non-limiting configurations, second passage 44 can be oriented to have a swirling component as well. That is, in some configurations it may be desirable to have the second passage 44 be angled both circumferentially and radially, with components in any combination of the axial direction, circumferential direction and radial direction. The specific angle of the angled passage can be determined based upon the amount of mixing and turbulence to be generated by the angle as well as space and other concerns at the inlet end of the RDE.

It should also be appreciated that although the configuration of FIG. 2 shows two passages 42, 44, it is well within the scope of this disclosure to have 3 or more passages with different relative angling of the passages to generate a desired amount of mixing at the inlet to the detonation chamber 12.

Still referring to FIG. 2, in this configuration one passage 42 can be for oxidant, while the second passage 44 carries a mixture of oxidant and fuel. Fuel can be injected through one or more fuel injectors 46 typically feeding into the passage substantially perpendicular or otherwise angled relative to the flow in the passage.

Fuel injectors 46 can be fuel injection orifices, or nozzles, or any other configuration which would be readily apparent to a person having ordinary skill in the art.

The angling of passages 42, 44 is designed and configured to induce a swirling or mixing of, and turbulence in, the flows before entry to the detonation chamber such that a relatively high degree of mixing of the reactants is accomplished. It is particularly desirable to have the reactants substantially homogeneously distributed through the flow into the inlet of detonation chamber 12.

In order to further enhance mixing, diffuser 40 can define an increase in flow area that generates an accompanying increase in pressure. In addition to the enhanced mixing this creates, it is also desirable because the increased pressure zone helps to insulate upstream areas such as fuel injector 46 from potential backflow of the detonation wave that circulates around detonation chamber 12. Without such insulation, the detonation wave can significantly interfere with normal operation of the nozzle, and make it very challenging to maintain high efficiency operation of the RDE.

In another non-limiting configuration, the angle of second passage 44 relative to axis A helps to insulate fuel injector 46 in second passage 44 from disruption by the detonation wave circulating in chamber 12 as the angle α creates a blind spot or structural shelter between detonation chamber 12 and fuel injector 46.

Still referring to FIG. 2, either or both of passages 42, 44 can be provided with additional structure to create more mixing. As shown, one or more walls 48, 50 can be positioned across the flow area of either or both of passages 42, 44, and arrays of holes, in some instances angled holes can be defined in walls 48, 50. These angled holes (not shown in greater detail in FIG. 2) can introduce further turbulence to flow passing through walls 48, 50. Further, when these holes are angled, they can be angled to induce a circumferential flow to the reactants passing through the holes. In the illustrated configuration, these holes induce a swirling or mixing flow to the oxidant. Further, the holes can be arranged to induce circumferential flow in the same direction as the detonation pulse rotating through detonation chamber 12, or counter to the direction of the detonation pulse, or both. In one configuration, holes in one passage could be angled to induce a swirl in one direction and holes in the other passage could be angled to induce a swirl in the opposite direction such that there is turbulence and also a net zero swirl entering combustion zone 12.

FIG. 2 shows second passage 44 with a splitter 52 that can be positioned to divide a flow passage, in this case flow passage 44, into two portions, with one portion rotating in one direction, for example the same direction as the detonation wave in detonation chamber 12 (arrow B FIG. 1), and the other portion rotating counter to this direction so as to again induce turbulence and a net zero swirl.

Finally, in another non-limiting configuration, splitter 52 can be considered as defining an inside diameter flow at 53, a mid flow at 55, and an outside diameter flow at 59 in first passage 42. In this configuration, the different portions of holes can be configured to balance flow in areas 53, 55 and 59 to again produce a net zero swirl of the reactants entering detonation chamber 12. Specific structure of walls 48, 50 and holes therein is discussed with respect to FIGS. 3, 3A and 3B below.

FIG. 2 shows that it may be desirable to position the fuel injector 46 downstream of walls 48, 50 with angled holes such that a good degree of turbulence can be induced into the oxidant before fuel is mixed with the oxidant.

First and second passages 42, 44 can be sized to have a flow area to produce a desirable pressure drop or flow rate, and either or both passage can be choked if necessary.

Figure 3:
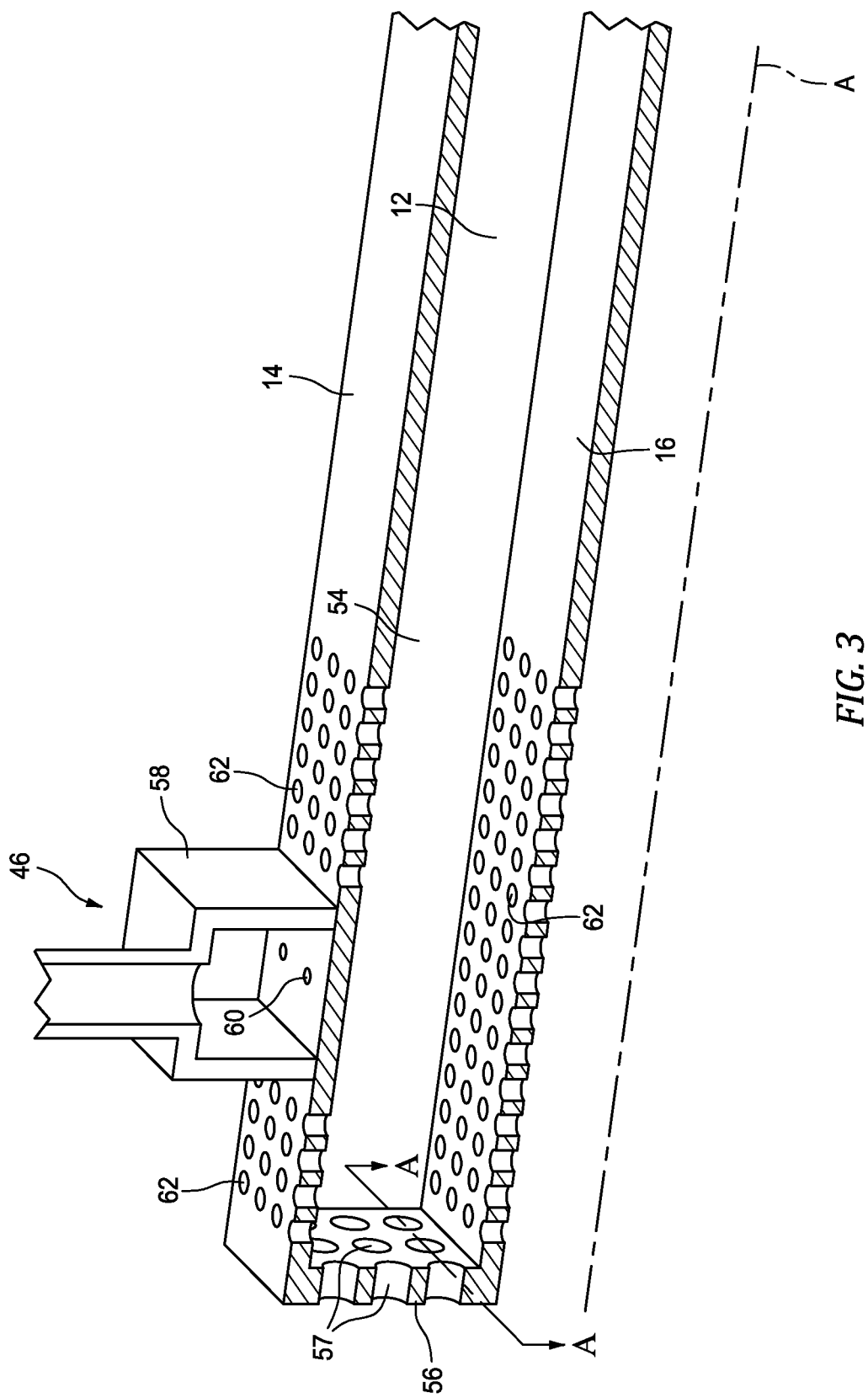
FIG. 3 illustrates another non-limiting configuration of a mixer for a rotating detonation engine.

FIG. 3 schematically illustrates a further non-limiting configuration based upon the holes as discussed above with respect to FIG. 2. FIG. 3 shows an inlet area 54 to the combustion zone of detonation chamber 12 that is defined between walls 14, 16. As shown, an upstream wall 56 can be positioned across a main inlet to inlet area 54. A plurality of holes 57 or openings are defined in an array in wall 56. In this configuration, this array of holes 57 is for receiving a main flow of oxidant.

FIG. 3 also shows a fuel injector 46 in the form of a housing 58 mounted to an outer surface of wall 14 and connected to a source of fuel. Fuel injector 46 can be communicated with oxidant flow in the mixer through apertures 60 between housing 58 and the mixing chamber. Still referring to FIG. 3, additional holes 62 can be defined in either or both of walls 14, 16, either upstream or downstream, or both, with respect to fuel injector 46. Additional holes 62 are configured such that additional reactants, in this case additional oxidant, can be fed to the mixing zone at positions that are axially downstream from holes 57. This delayed introduction of additional oxidant can help to maintain proper mixing of reactants to support stable detonation. Holes 57, 62 can be angled or oriented, for example relative to axis A, in order to further induce mixing through imparting additional circumferential or radial component to reactant flow.

Figure 3B:
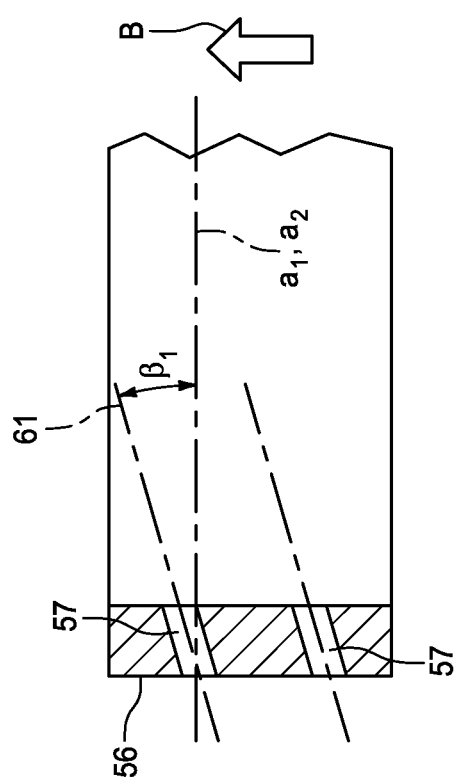
FIGS. 3A and 3B illustrate further detail of the configuration of FIG. 3 in sectional views taken along the lines A-A in FIG. 3.
Figure 3A:
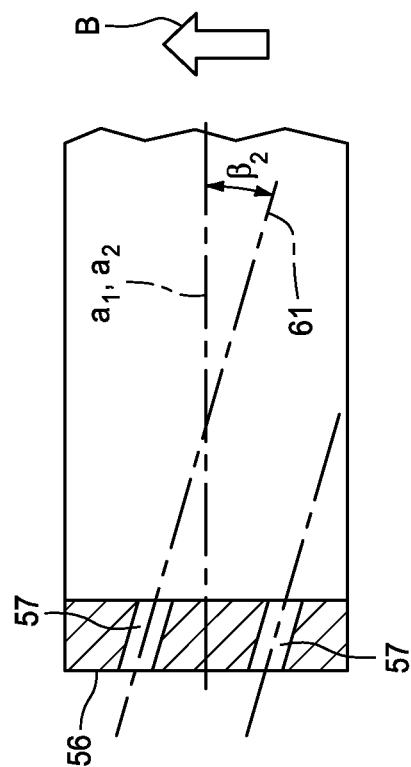

FIG. 3A is a cross section taken along the lines A-A shown in FIG. 3. In FIG. 3A, wall 56 has holes 57 oriented at an angle relative to flow through this passage. As shown, holes 57 can be directed along an axis 61 which defines an angle ($\beta_1$) with respect to first or second passage axis $a_1$, $a_2$. Further, different groups or portions of holes 57, 62 can be angled differently from other groups or portions of these openings. For example, holes 57 in wall 56 may be divided by a splitter such as is shown in FIG. 2 at 52, with openings on one side of the splitter angled to induce rotation with the detonation wave as shown in FIG. 3A, and openings on the other side of the splitter angled to induce rotation counter to that of the detonation wave as shown in FIG. 3B which is a sectional view similar to FIG. 3A but taken through a different portion of the array of holes. Thus, holes 57 in FIG. 3B are oriented along axis 61 at an angle ($\beta_2$) relative to axis $a_1$, $a_2$ where the angle $\beta_1$ of one group or portion of holes 57 is directed in the same direction as the direction of rotation of the detonation wave as represented by arrow B, while the angle ($\beta_2$) of the other group or portion of holes 57 is directed counter to arrow B. Angles ($\beta_1$, $\beta_2$) can be between 10 and 30 degrees. Main or primary openings such as holes 57 on wall 56 can have one size while holes 62 on walls 14, 16 can have a different size. Further, openings 62 can also be oriented in various ways to induce desirable flow characteristics as well.

The holes 57, 62 of this configuration can limit flame stabilization upstream (due to high equivalence ratio) and increase mixing downstream of fuel injection. This flow of oxidant, through holes 57, 62, especially holes 62 in walls 14, 16, can also be angled (zero-net-swirl) to create additional shear for mixing. Further, staged oxidant, that is, oxidant introduced in stages along an axis of the mixer/inlet zone, can help to provide more control to maintain a desired equivalence ratio.

It should be readily apparent that the openings of FIGS. 3, 3A, 3B could be utilized in the walls 48, 50 of FIG. 2. Alternatively, instead of walls with openings, in another non-limiting configuration, swirlers can be positioned at either location in passages 42, 44. Such swirlers can be defined by arrays of angle slots or vanes, for example.

FIGS. 4 and 5 illustrate a configuration that utilizes vanes 64 to define a swirler to produce additional mixing. The configuration of FIG. 4 could take the place of wall 48 of FIG. 2, for example.

In FIG. 4, vanes 64 are shown extending between walls 66, 68 that define a flow passage (such as either or both of flow passages 42, 44 shown in FIG. 2) leading to the detonation zone of an RDE. FIG. 5 shows an enlarged portion of FIG. 4 with wall 66 removed to better illustrate the structure and placement of vanes 64. As shown, vanes 64 can have a vane axis V and can be angled relative to an incoming flow direction (Arrow C), and/or relative to a flow passage axis $a_1$, $a_2$, in order to induce a swirl and turbulence to the flow of fluid, in this case oxidant, as it passes vanes 64. Vanes 64 can be angled relative to expected flow C at an angle that is selected in order to impart a desired amount of swirling flow or turbulence. As one non-limiting example, vanes 64 can be angled relative to expected flow direction C (and/or axes $a_1$, $a_2$) at an angle ($\gamma$) defined between vane axis V and flow direction C. Angle ($\gamma$) can be between 10 and 65 degrees.

Still referring to FIGS. 4 and 5, in this configuration vanes 64 can be provided with fuel injector apertures 70 that can be communicated with fuel flow through internal passages in the vanes 64 (not shown) to vane fuel inlets 72, which can receive fuel through one or more openings in wall 66 or any other source of fuel. Fuel injector apertures 70 can be provided in groups of two or more in each vane, for example 3 apertures 70 per vane 64 as shown in FIG. 5. These multiples of apertures 70 per vane 64 can be vertically spaced along vane 64, that is, the apertures can be distributed along the dimension of vane 64 that extends between wall 66 and wall 68. In a further non-limiting configuration, apertures 70 can be provided in alternating vanes 64 as shown. Fuel can be introduced through apertures 70 from the front of swirler vanes 64, either on the pressure side, or on the suction side, or on the trailing edge of such vanes.

Figure 7:
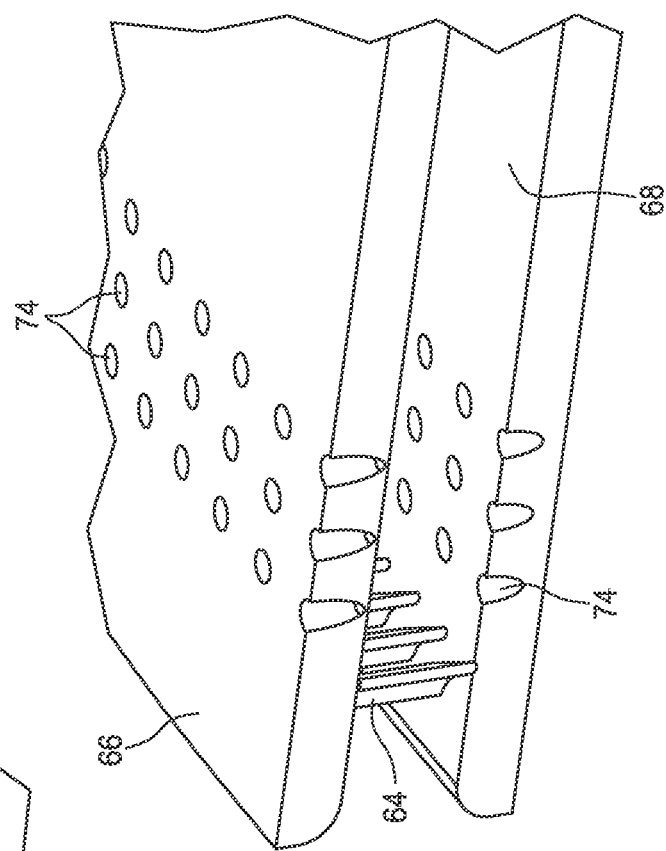
FIG. 7 is a further schematic illustration of the configuration of FIG. 4.

With reference also to FIG. 7, vanes 64 can be combined with air inlet openings 74 in one or both of walls 66, 68, and these openings 74 can be downstream of vanes 64 such that additional oxidant mixing and downstream air can be introduced to fuel from injector apertures 70. In this configuration, with sufficiently high flow velocity for the oxidant, or air, even liquid fuels can be effectively atomized and thereby good mixing can be produced. Openings 74 can be simple straight walled openings, or can be formed as nozzles (converging) or diffusers (expanding), depending upon the flow characteristics that are desired. FIG. 7 shows nozzles on wall 66 and diffusers on wall 68. Air inlet openings 74 can be other shapes as well, such as but not limited to converging then diverging, or serpentine.

Figure 6:
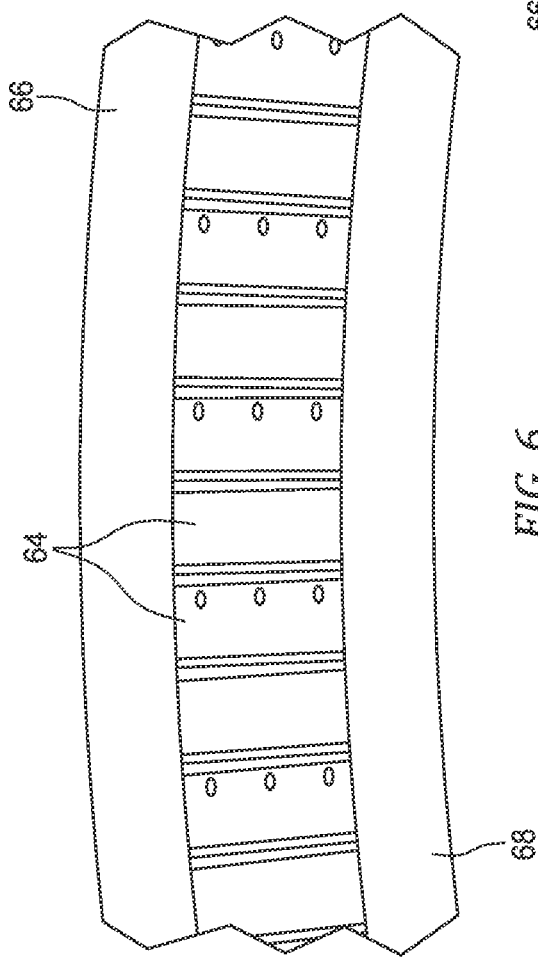
FIG. 6 further illustrates an aspect of the configuration of FIG. 4.

As set forth above, another aspect of an RDE is that as the detonation wave rotates around the detonation chamber, the wave can generate an upstream disturbance or disruption of upstream components of the RDE, especially fuel injectors. It is therefore desirable to block or otherwise protect these upstream components from the detonation wave. In the configuration of FIGS. 4-7, it can be seen that the angled vanes 64 can be spaced from each other such that from the detonation chamber, there is no direct line of sight past the vanes to an area upstream of the vanes. This is illustrated in FIG. 6, which is a view directly upstream from the detonation chamber. This view is also referred to as "aft-looking-forward", or "ALF", and in the configuration of FIG. 6, such a view is blocked through vanes 64. As shown, vanes 64 are angled and spaced relative to each other such that there is overlap in a purely circumferential dimension and thereby no direct line of sight from the detonation chamber to upstream of the vanes. This helps to shield the upstream components such as fuel injectors and the like from disruption caused by the detonation wave, and speeds the recovery of such components from any disruption so that the RDE can operate more smoothly and efficiently.

Returning to the configuration of FIG. 2, this aspect of the disclosure is also produced in this configuration, for example by the diffuser 40 which creates an increased pressure zone that is more resistant to the detonation wave, and also by positioning the fuel injectors 46 on the second passage 44 again to have no direct line of sight from the detonation chamber 12 to the fuel injector 46.

Further still, the configuration shown in FIG. 3 also helps to prevent disruption of upstream components by the detonation wave. Turbulence created by holes 62 and 57 also helps to resist the disruption of the detonation wave. Further, the wall 56 with holes 57 serves as a damper on the direct line of sight effect that the detonation wave will have on upstream components.

It should be appreciated that although different configurations are illustrated in FIGS. 2, 3 and 4-7, these configurations can be utilized individually, or in combination with each other, and any such combination of these configurations is considered to be within the scope of this disclosure.

The various configurations disclosed herein help to guarantee desired mixing distance, while swirling improves fuel/air mixing in a circumferential direction. High turbulence level generated by swirling flow enhances fuel/air mixing, and properly designed swirlers can provide a certain degree of isolation from plenum or disruptive impact of the rotating detonation wave.

One or more embodiments have been described. Nevertheless, it will be understood that various modifications may be made. For example, different combinations of vanes and flow apertures could be utilized, or a different number of flow passages can be provided. These modifications can influence details of particular implementations, but are otherwise within the scope of this disclosure. Accordingly, other embodiments are within the scope of the following claims.

We claim:

1. A combustor for a rotating detonation engine, the combustor comprising:
    a radially outer wall extending along an axis;
    a radially inner wall extending along the axis, wherein the radially inner wall is positioned within the radially outer wall to define an annular detonation chamber having an inlet for fuel and oxidant and an outlet;
    a flow passage for feeding oxidant to the inlet; and
    a wall defined across a flow area of the inlet and an array of holes defined in the wall to induce turbulence to oxidant flowing through the array, wherein the array of holes are oriented along an array axis, wherein the flow passage comprises a first flow passage having a first passage axis and a second flow passage having a second passage axis, and wherein the array axis is oriented to the first passage axis or the second passage axis at an angle ($\beta$1) of between 10 and 30 degrees.

2. The combustor of claim 1, wherein the array of holes comprises a first portion of holes oriented along a first array axis oriented relative to the first passage axis or the second passage axis at a first portion angle ($\beta$1) of between 10 and 30 degrees, and the array of holes comprises a second portion of holes oriented along a second array axis oriented relative to the first passage axis or the second passage axis at a second portion angle ($\beta$2) of between 10 and 30 degrees, and wherein the first portion angle and the second portion angle are oppositely angled relative to the first passage axis or the second passage axis.

3. The combustor of claim 2, further comprising a splitter separating the first portion of holes from the second portion of holes.

4. The combustor of claim 3, wherein the splitter separates the first portion of holes radially from the second portion of holes.

5. The combustor of claim 1, further comprising additional holes downstream of the wall for introducing additional oxidant to the flow passage.

6. The combustor of claim 1, wherein the fuel is fed to the flow passage through a fuel injector port, and wherein the fuel injector port is located downstream of the wall.

* * * * *